US008432577B2

(12) United States Patent
Niculescu

(10) Patent No.: US 8,432,577 B2
(45) Date of Patent: Apr. 30, 2013

(54) SCANNER PARAMETER TECHNIQUES

(75) Inventor: Marius Niculescu, Ottawa (CA)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 12/121,700

(22) Filed: May 15, 2008

(65) Prior Publication Data

US 2009/0284807 A1 Nov. 19, 2009

(51) Int. Cl.
*H04N 1/00* (2006.01)
*H04N 1/04* (2006.01)
*H04N 1/46* (2006.01)
*G06F 15/00* (2006.01)

(52) U.S. Cl.
USPC ............ 358/1.6; 358/408; 358/474; 358/505; 358/1.9

(58) Field of Classification Search ............ 358/1.6, 358/1.9, 408, 474, 505
See application file for complete search history.

(56) References Cited

U.S. PATENT DOCUMENTS

| 6,263,117 | B1 | 7/2001 | Lee | |
|---|---|---|---|---|
| 6,459,825 | B1 | 10/2002 | Lippincott | |
| 6,522,791 | B2 | 2/2003 | Nagarajan | |
| 6,535,914 | B1 | 3/2003 | Pearson et al. | |
| 6,665,098 | B1 | 12/2003 | Nagarajan | |
| 2003/0048303 | A1 | 3/2003 | Mesa et al. | |
| 2004/0070787 | A1 | 4/2004 | Hsu et al. | |
| 2006/0147235 | A1* | 7/2006 | Sadovsky et al. | 400/62 |
| 2006/0268369 | A1 | 11/2006 | Kuo | |
| 2007/0121122 | A1 | 5/2007 | Kaltenbach | |
| 2007/0285705 | A1* | 12/2007 | Kodimer et al. | 358/1.15 |
| 2009/0021798 | A1* | 1/2009 | Abahri | 358/474 |

OTHER PUBLICATIONS

"Fujitsu Introduces New ScanSnap Scanner with Windows Vista Compatibility", Jun. 4, 2007, Fujitsu Computer Products of America, Inc. pp. 3.
"HP PrecisionScan Pro", 1999-2007 by Wayne Fulton, pp. 7.

* cited by examiner

*Primary Examiner* — Thomas Lett
(74) *Attorney, Agent, or Firm* — Wolfe-SBMC

(57) ABSTRACT

Scanner parameter techniques are described. In an implementation, one or more computer-readable media comprise instructions that are executable by a computer to detect a mode in which one or more scan parameters are set by a user at a scanner and when a scan is performed in conjunction with the detected mode, keep the one or more scan parameters as set at the scanner for the scan.

20 Claims, 4 Drawing Sheets

SCANNER PARAMETER TECHNIQUES

BACKGROUND

Scanners (e.g., a still image acquisition device such as a video frame grabber, web camera, traditional flatbed scanner, and so on) may be used to input a variety of different information into a computer. For example, a scanner may be used to scan and analyze an image in some way, such as to capture images and text from a document to be saved on a computer. The computer may then further process the image, such as to perform optical character recognition (OCR) such that text in the image may be edited by a user, crop the image, reduce "red eye", and so on.

Traditional techniques that were employed by a computer to receive acquired data from a scanner, however, involved control that was centralized at the computer. For example, a traditional application that was to receive an image from a scanner dictated to the scanner the particular settings that were to be used to capture the image. These settings are then applied by the scanner when performing the scan. Therefore, this technique forced the user to first interact with the computer to provide the settings and then with the scanner to perform a scan (e.g., to position a document), which could be frustrating and inefficient.

SUMMARY

Scanner parameter techniques are described. In an implementation, one or more computer-readable media comprise instructions that are executable by a computer to detect a mode in which one or more scan parameters are set by a user at a scanner and when a scan is performed in conjunction with the detected mode, keep the one or more scan parameters as set at the scanner for the scan.

In an implementation, a scanner comprises a plurality of image sources and one or more modules to detect from which of a plurality of different sources a scan is available and form a communication to report the detected image source to a computer.

In an implementation, a method comprises executing an operating system at a computer to receive an indication that references from which of a plurality of image sources of a scanner a scan is available and report which of the plurality of images sources the scan is available to an application executed on the computer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

In traditional systems, scanner initiated scanning (which also may be referred to as "push scanning") may be performed after a computer and a scanner negotiate scan parameters through a device communication protocol. Further, this negotiation may involve pre-selection by the computer (and not the scanner) of a specific image source to be used by the scanner to perform the scan, e.g., a flatbed or automatic document feeder. Consequently, an application that is to receive a scan traditionally overwrote scan parameters set at the scanner and may even attempt to initiate the scan at an incorrect image source of the scanner.

Scanner parameter techniques are described. In an implementation, a mode is supported such that scan parameters set at the scanner are retained. For example, support for an "automatic mode" may be detected by an application that is to receive a scan. When the automatic mode is detected, the application may retain scan parameters as set at the scanner to perform the scan, such as resolution, color mode, crop area, and so on. Therefore, in this example the scan parameters may be set by a user at the scanner and have those parameters retained for the scan by the application that is to receive the scan. Further discussion of retention of scanner parameters may be found in relation to FIG. 3.

In another implementation, an image source that is to be used to perform a scan is communicated to the application. For example, a user may place a document on a document feeder of a scanner. The scanner may then communicate to an application on a computer that the document is available to be scanned and the image source of the scanner that is to be used to perform the scan. The application may then negotiate scan parameters and initiate the scan from the correct image source of the scanner. In an implementation, this technique may be utilized in conjunction with the previous described techniques to retain scan parameters set at the scanner that were used to perform the scan. Further discussion of scanner parameters that notify which of a plurality of image sources of a scanner or to be used to perform a scan may be found in relation to FIG. 4.

In the following discussion, an example environment is first described that may utilize scanner setting techniques. Example procedures are then described which may be employed in the example environment, as well as in other environments. Therefore, a reference will be made to the example environment in the discussion of the example procedures. The example procedures may be employed in a variety of other environments (e.g., via other peripheral devices) without departing from the spirit and scope thereof.

Example Environment

Figure 1:
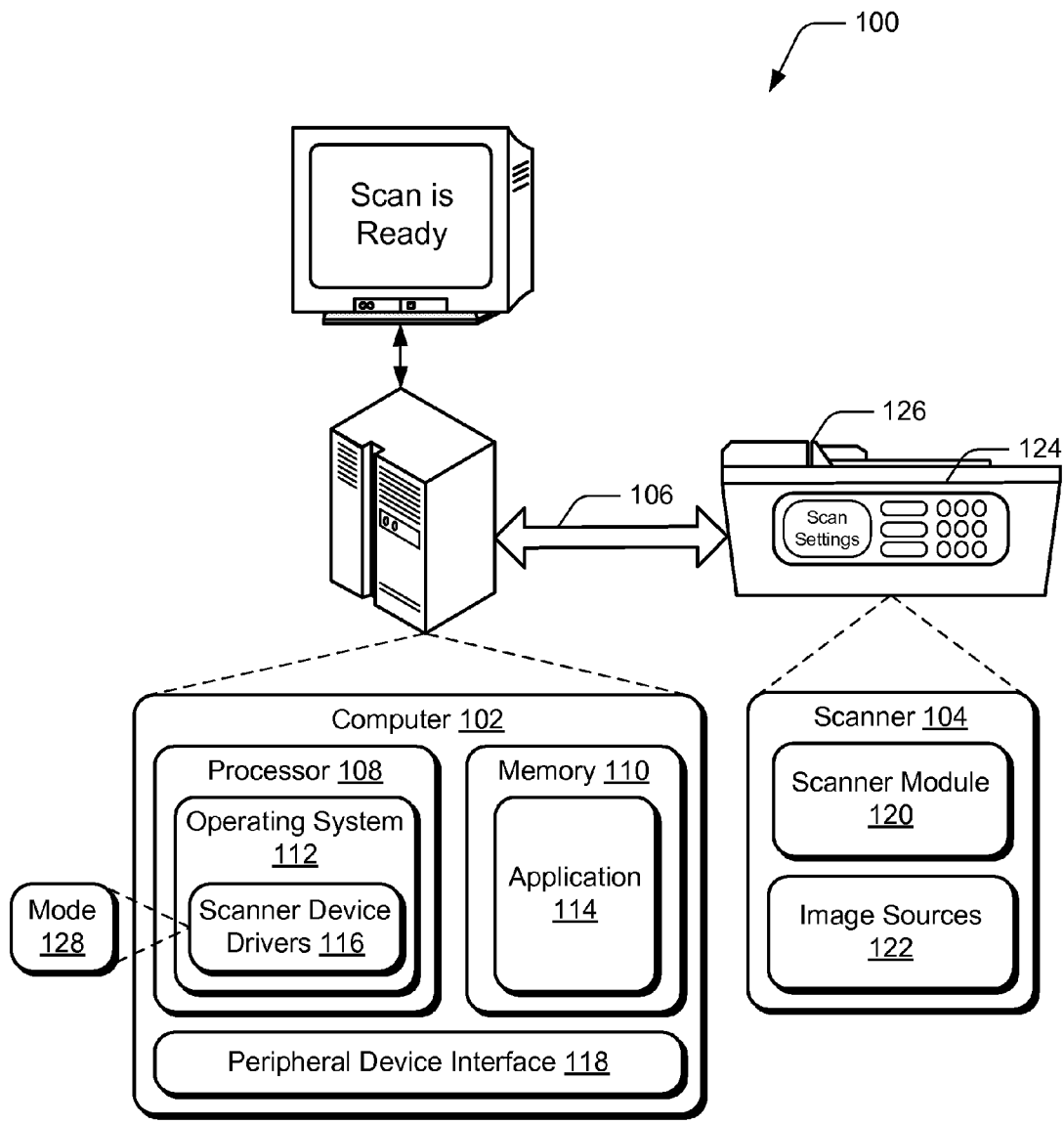
FIG. 1 is an illustration of an environment in an example implementation that is operable to employ scanner setting techniques.

FIG. 1 is an illustration of an environment 100 in an example implementation that is operable to employ scanner setting techniques. The environment 100 includes a computer 102 that is communicatively coupled to a scanner 104 via a local connection 106. Although a local connection 106 is described, a variety of different connection may be employed, such as a remote connection over a network, e.g., a packet-switched network such as the Internet. The computer 102 may be configured in a variety of ways. For example, the computer 104 may be configured as a network computer, a desktop computer, a mobile station, an entertainment appliance, a set-top box communicatively coupled to a display device, a wireless phone, a game console, and so forth.

The computer 102 is illustrated as including a processor 108 and memory 110. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for the computer 102, may include, but are not limited to, quantum computing, optical computing, mechanical computing (e.g., using nanotechnology), and so forth.

Additionally, although a single memory 110 is shown, a wide variety of types and combinations of memory may be employed, such as random access memory (RAM), hard disk memory, removable medium memory, and other types of computer-readable media. Likewise, a variety of the devices, software and modules depicted in the environment 100 of FIG. 1 may also be representative of one or more devices, e.g., the processor 108 may be representative of a plurality of central processing units.

The computer 102 as illustrated as executing an operating system 112 on the processor 108, which is also storable in memory 110. The operating system 112 is representative of functionality to "abstract" underlying functionality of the computer 102. For example, the operating system 112 may provide a foundation for the application 114 to be executed on the computer 102 without the application having to "know" the specific configuration of the computer 102, e.g., which particular "kind" processor 108 is employed by the computer 102, amounts of memory 110, how to communicate over a network connection, and so on.

The operating system 112 is further illustrated as including a plurality of scanner device drivers 116. Like the operating system 112, the scanner device drivers 116 may be used to abstract underlying functionality, which in this case enables operating system 112 to communicate with the scanner 104. For example, each of the software device drivers 116 may be configured to interact with a specific type of a scanner, such as to communicate using a particular protocol, represent functionality in a particular way, and so on. Thus, different scanner device drivers 116 may be written to abstract underlying functionality of a variety of different scanners for use by the operating system 112. The scanner device drivers 116 may enable the operating system 112 (and consequently the application 114) to communicate with a variety of different scanners via a peripheral device interface 118 without modifying the operating system 112, itself. The peripheral device interface 118 may assume a variety of configurations such as a universal serial bus (USB), a local wireless (e.g., radio frequency) connection, and so on.

The scanner 104 is illustrated as including a scanner module 120 and one or more image sources 122. The scanner module 120 is representative of functionality of the scanner 104 to capture an image and output the captured image, e.g., to the computer 102 over the local connection 106. Image sources 122 are representative of devices and related functionality that may be used to capture the image. As shown in the illustration of the scanner 104 in FIG. 1, for instance, the scanner 104 includes a flatbed image source 124 and an automatic document feeder image source 126. A variety of other image sources are also contemplated, such as a film image source that is configured to capture an image from film, transparency, and so on. Although a plurality of image sources are shown for the scanner 104 of FIG. 1, it should be readily apparent that the scanner 104 may also include a single image source.

As previously described, traditional device initiated scanning was accomplished after negotiation of scan parameters between a scanner and a computer, and more particularly an application on the computer. The scan parameters were pre-selected at the computer using these traditional techniques such that even when a user was able to specify one of the parameters at the scanner, the parameter was in some cases overridden by the computer. Additionally, the traditional techniques did not specify which image source of the scanner is to be used to provide the scan. Therefore, an application attempting to initiate a scan may select an incorrect image source. Consequently, users were forced to select scan parameters at the computer and then manually interact with the scanner.

In an implementation, the operating system 112 and/or the scanner device drivers 116 provide a mode 128 in which scan parameters input at the scanner 104 to perform a scan are retained by the computer 102. In this way, the scan parameters may be defined at the scanner 104, thereby enabling the scanner 104 and/or a user of the scanner 104 to specify the scan parameters at the time of content acquisition, e.g., initiation of the scan. By including this functionality as part of the operating system 112, the operating system 112 may abstract the mode 128 to the application 114 and thus the application 114 may be configured without "knowing" how the underlying functionality is provided.

In this implementation, users are allowed to choose scan parameters directly at the scanner 104 when initiating a scan as opposed to having to pre-configure the scan parameters at the computer 102. Further, push-scan scenarios may be supported such that a full programmatic scan parameter negotiation between the application 114 and the scanner 104 is not performed. Rather, the scan parameters specified at the scanner 104 are used to perform the scan.

In another implementation, the scanner module 120 may detect and report to an application (e.g., the operating system 112 and/or the application 114) the particular image source that is to be used to perform a scan. For example, the scanner module 120 may detect that the automatic document feeder image source 126 has initiated a scan of the document. The scanner module 120 may then report this information over the local connection 106 to the computer 102. This information may then be used in a variety of ways. For example, the application 114 may set scan parameters to be used to perform the scan using the automatic document feeder image source 126. Thus, the application 114 in this example may determine the correct image source to be used to perform the scan and proceed accordingly. A variety of other examples are also contemplated.

Consider a scenario in which a user connects the scanner 104 to the computer 102, e.g., directly through a local port of the computer 102 over the local connection 106, over a network, and so on. The user may then interact with one or more buttons and display devices of the scanner 104 to set scan parameters that are to be used to perform the scan. A variety of different scan parameters may be input, such as color mode, scan resolution, crop area, and so on.

Additionally, the user may position a subject to be scanned by a particular one of the image sources 122 (e.g., by placing a document on the automatic document feeder image source 126) and select one or more the buttons to initiate the scan. Therefore, instead of having the computer 102 specify the scan parameters (and more particularly the operating system 112 and/or the application 114 on the computer 102), the user can configure the scan parameters at the scanner 104 and allow the scanner to use these scan parameters to perform the scan without negotiating with the computer 102.

For example, the operating system 112 and/or the application 114 may be configured to use the mode 128 to retain the scan parameters when detected. Therefore, a user may go directly to the scanner 104 and place documents to be scanned on the automatic document feeder image source 126, the flatbed image source 124, and so on. The user may then initiate the scan, which may cause a registered event handler application (e.g., application 114) to start and acquire the scan by detecting the mode 128. Thus, in this example the scan parameters set at the scanner 104 are retained. A variety of different architectures may be employed to support the scanner setting techniques, an example of which may be found in relation to the following figure.

Figure 2:
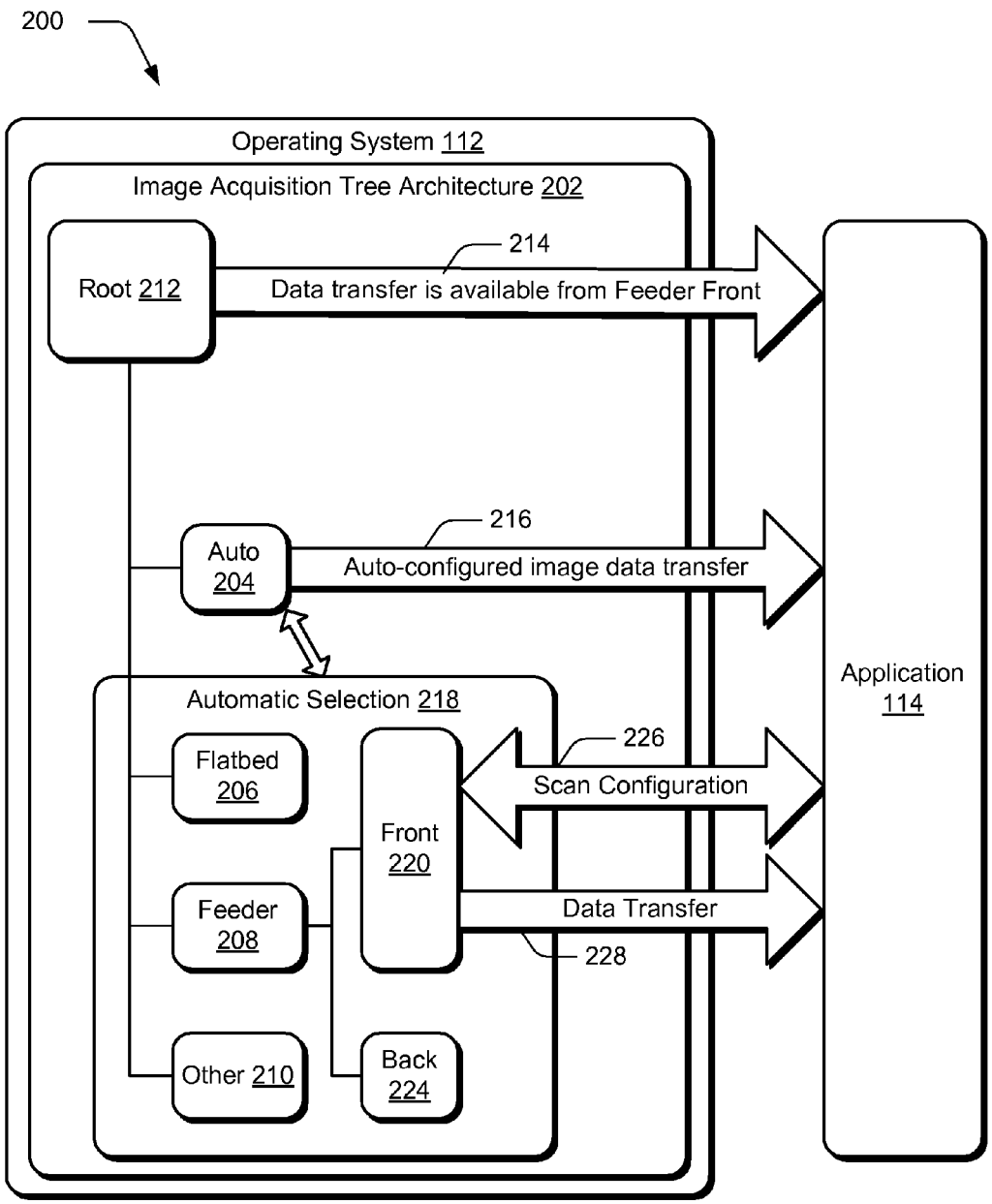
FIG. 2 is an illustration of a system in an example implementation showing an image acquisition tree architecture that may be employed by an operating system of FIG. 1.

FIG. 2 depicts a system 200 in an example implementation showing an architecture configured to support the scanner setting techniques within an operating system. In an embodiment, the operating system 112 of FIG. 1 may include an image acquisition tree architecture 202 that acts as a driver interface extension (e.g., to extend the scanner device drivers 116 of FIG. 1) to support the previously described techniques.

For example, the image acquisition item tree architecture 202 may include an auto 204 image source item to indicate a particular image source of the scanner 104. The auto 204 image source item may coexist on the image acquisition item tree architecture 202 along with other programmable image source items, such as flatbed 206, feeder 208, and "other" 210 image source items, e.g., storage, film, and so on. Therefore, when the application 114 requests image acquisition from the auto 204 image source item the scanner 104 may automatically select the appropriate hardware input source as well as scanner parameters that are to be used to perform the scan.

For example, as depicted in FIG. 2 a root 212 item of the image acquisition tree architecture 202 may indicate 214 to the application 114 that a data transfer is available from a feeder front of the scanner 104. Further, the mode 128 may be set such that the application 114 is to retain scan parameters set at the scanner 104. Accordingly, an auto configured image data transfer 216 is initiated from the auto 204 image source item to the application 114.

The auto 204 image source item may then initiate auto selection 218 of the image sources. As previously described, the flatbed 206 image source item, the feeder 208 image source item and the other 210 image source item correspond to the image sources of the scanner 104. Further, these image source items may have sub-items, e.g., the front 220 and back 224 image source items of the feeder 208 image source item. In the current example, the front 220 image source item may negotiate scan configuration 226 with the application 114. In another example, however, the scan settings may be "pushed" to the application 114 that were set in the scanner 104. A data transfer 228 may then be performed to transfer the scan from the front 220 image source item to the application 114. A variety of other examples are also contemplated, further discussion of which may be found in relation to the following procedures.

Although a scanner 104 is described in relation to the example environment 100, it should be readily apparent that a wide variety of peripheral devices (e.g., devices that expand functionality of the computer 102 that are distinct from the processor 108 and memory 110 of the computer 102) may also employ the settings techniques described herein. Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware.

In the case of a software implementation, the module, functionality, or logic represents program code that performs specified tasks when executed on a processor (e.g., CPU or CPUs). The program code can be stored in one or more computer readable memory devices, e.g., the memory 110 of FIG. 1. The features of the scanner setting techniques described below are platform-independent, meaning that the techniques may be implemented on a variety of commercial computing platforms having a variety of processors.

Example Procedures

The following discussion describes scanner parameter techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
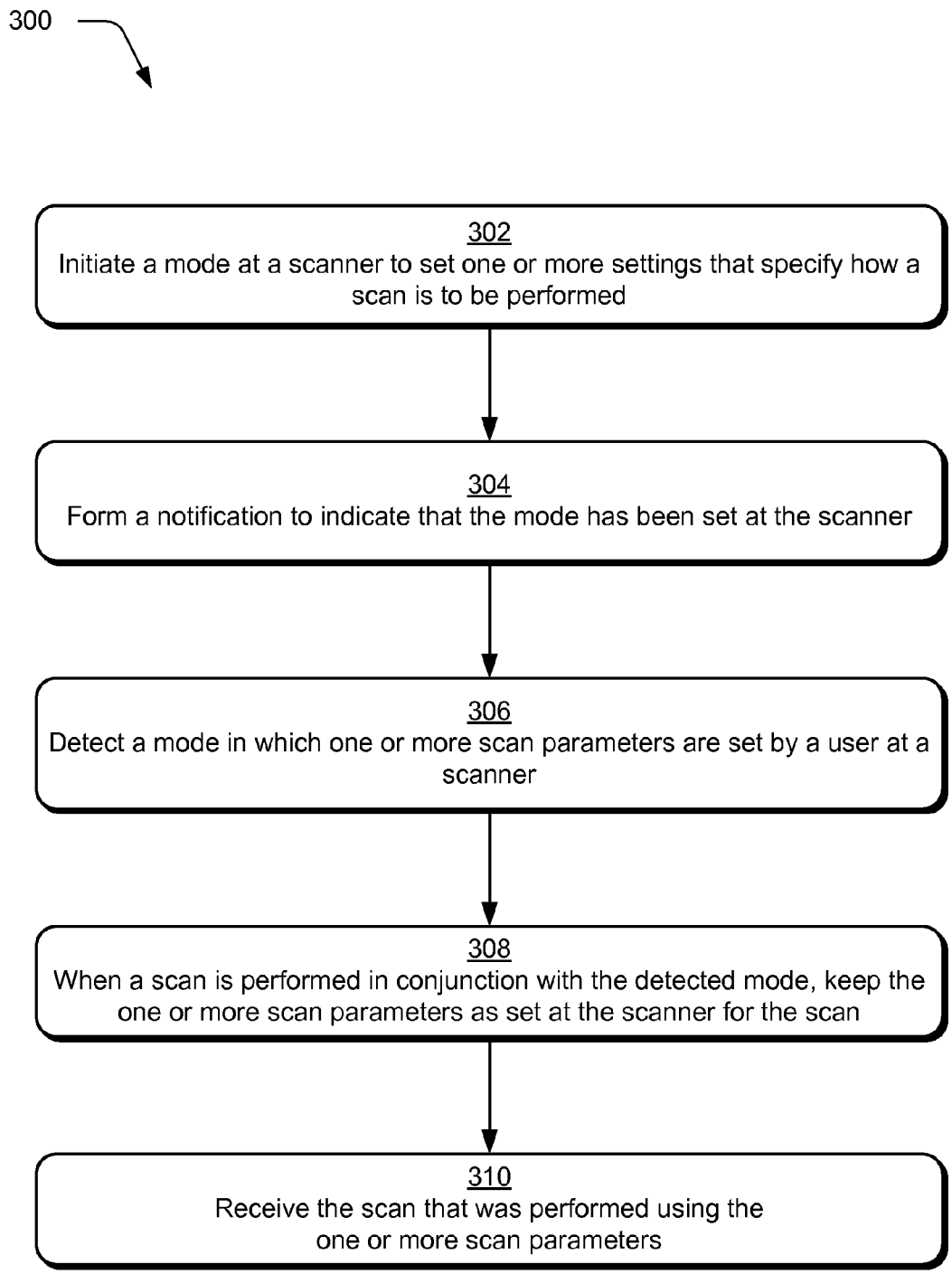
FIG. 3 is a flow diagram depicting a procedure in an example implementation in which scan parameters that are set by a scanner are retained to perform a scan.

FIG. 3 depicts a procedure 300 in an example implementation in which scan parameters that are set by a scanner are retained to perform a scan. A mode is initiated at the scanner to set one or more settings that specify how a scan is to be performed (block 302). For example, the mode 128 may be initiated by the scanner 104 in response to an input received at the scanner 104 from a user to specify one or more scan parameters.

A notification is formed to indicate that the mode has been set at the scanner (block 304). Continuing with the previous example, the scanner module 120 may detect that a user has set the one or more scan parameters at the scanner 104. Responsive to this detection, the scanner module forms a notification to be communicated over the local connection 106 to the computer 102, and more particularly the operating system 112 and/or the application 114.

A mode is detected in which one or more scan parameters are set by user at a scanner (block 306). The operating system 112, for instance, may receive the notification over the local connection 106 from the scanner 104. The notification may indicate (e.g., using a driver extension) that a scan is to be performed using one or more parameters set at the scanner 104. Therefore, the scan may be performed without negotiation between the scanner 104 and the computer 102. In an implementation, however, a transfer file format is set between the computer 102 (e.g., the operating system 112 and/or the application 114) and the scanner 104 before the scan is performed.

When a scan is performed in conjunction with the detected mode, the one or more scan parameters are kept as set at the scanner for the scan (block 308). In an implementation, the scan is performed without waiting for a response from the computer 102. For example, the scan may be performed and stored at the scanner 104 without waiting for a response from the computer 102. The computer 102 may then subsequently retrieve the scan. A variety of other examples are also contemplated, such as to negotiate scan parameters that were not set at the scanner 104. For instance, a user may specify a resolution of the scan at the scanner 104 and have the transfer file format and data compression mode negotiated between the computer 102 and the scanner 104. The scan that was performed using the one or more scan parameters may then be received (block 310).

Figure 4:
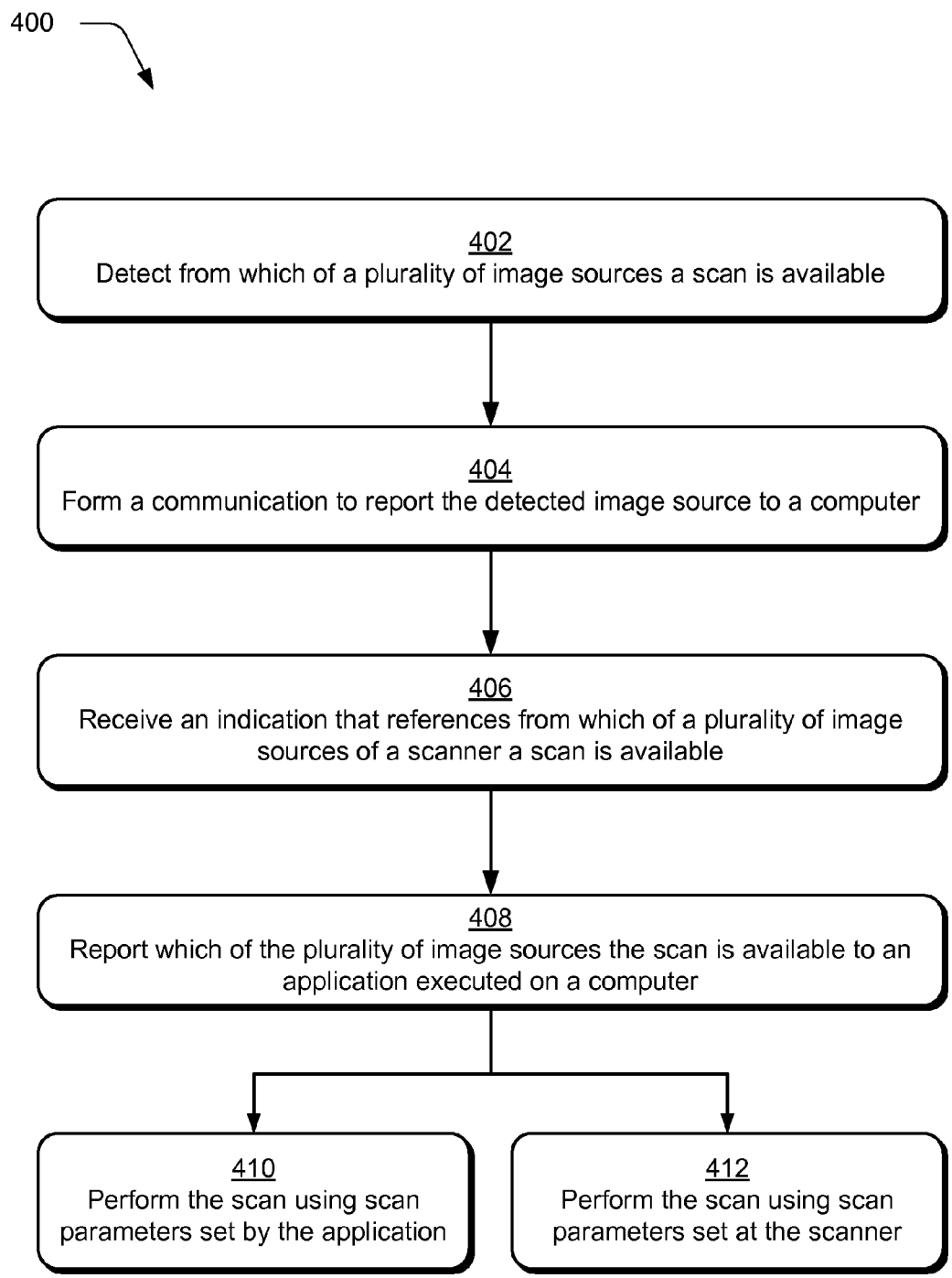
FIG. 4 is a flow diagram depicting a procedure in an example implementation in which an image source is specified by a scanner.

FIG. 4 depicts a procedure 400 in an example implementation in which an image source is specified by a scanner. A scanner detects from which of a plurality of image sources a scan is available (block 402). For example, the scanner module 128 may determine whether a scan is available from an automatic document feeder image source 126 or a flatbed image source 124.

A communication is formed to report the detected image source to a computer (block 404). The communication, for instance, may be transmitted over a local connection 106 or a remote connection (e.g., over the Internet) to the computer, e.g., a USB connection. The communication may be configured in a variety of ways, such as to target a particular image source item in the image acquisition tree architecture 202 of the operating system 112 as shown and described in relation to FIG. 2.

An indication is received that references from which of a plurality of image sources of a scanner a scan is available (block 406), which may be received at an operating system 112 of the computer 102. The operating system 112 may then report which of a plurality of image sources the scan is available to an application executed on a computer (block 408). The report may be used in a variety of ways to perform the scan.

For example, the scan may be performed using scan parameters set by the application (block 410). In this way, the application may correctly identify the image source and set scan parameters to be used by the image source to perform the scan accordingly. In another example, the scan may be performed using scan parameters set at the scanner (block 412), examples of which were described in relation to the previous figure.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A scanner comprising:
    a plurality of image sources; and
    one or more modules stored on the scanner to detect from which of the plurality of image sources a scan is available and form a communication to report the detected image source to a computer that is remote from the scanner, the communication configured to target a particular image source item in an image acquisition tree architecture of an operating system of the computer, at least one of the plurality of image sources corresponding to an image source item in the image acquisition tree architecture and having multiple portions that correspond, respectively, to sub-items of the image source item.

2. A scanner as described in claim 1, wherein at least one of the image sources includes a feeder that is configured to automatically feed one or more subjects of the scan.

3. A scanner as described in claim 1, wherein at least one of the image sources is configured as a flatbed image capture device.

4. A scanner as described in claim 1, further comprising one or more input devices to receive one or more inputs from a user to:
    set one or more scan parameters; and
    initiate a mode in which the set one or more scan parameters are kept at the computer for the scan.

5. A scanner as described in claim 1, wherein the communication is also formed to indicate that the scan is available.

6. A scanner as described in claim 1, wherein the communication is formed responsive to initiation of the scan at the detected image source.

7. One or more computer-readable memory devices storing instructions that are executable by a computer to:
    utilize an image acquisition tree architecture at the computer to extend scanner device drivers of a scanner, the image acquisition tree architecture comprising an auto image source item and multiple programmable image source items corresponding to image sources at the scanner;
    detect a mode in which one or more scan parameters are set by a user at the scanner that is remote from the computer;
    when a scan is performed in conjunction with the detected mode, keep at the computer the one or more scan parameters as set at the scanner for the scan; and
    initiate, using the auto image source item, an auto configured image data transfer to an application from the image acquisition tree architecture;
    responsive to initiation of the auto configured image data transfer, use the auto image source item to initiate automatic selection of an image source via selection of a corresponding image source item in the image acquisition tree architecture that is configured to transfer data from the scanner to the application.

8. One or more computer-readable memory devices as described in claim 7, wherein the mode is detected through interaction with a device driver configured to communicate with the scanner.

9. One or more computer-readable memory devices as described in claim 7, wherein the mode is detected responsive to receipt of a notification that the scan has been initiated.

10. One or more computer-readable memory devices as described in claim 7, wherein the mode is detected responsive to receipt of a notification that the mode has been set at the scanner.

11. One or more computer-readable memory devices as described in claim 7, wherein the scanner is communicatively coupled to the computer as a peripheral device.

12. One or more computer-readable memory devices as described in claim 7, wherein the scan is performed without specifying the one or more scan parameters at the computer.

13. One or more computer-readable memory devices as described in claim 7, wherein the computer-executable instructions are further executable to detect which of a plurality of image sources of the scanner were used to provide the scan.

14. One or more computer-readable memory devices as described in claim 7, wherein the one or more scan parameters include resolution, color mode or crop area.

15. A method comprising executing an operating system at a computer to:
    receive, at the operating system and from a scanner that is remote from the computer, an indication that references from which of a plurality of image sources of the scanner a scan is available, the operating system comprising an image acquisition tree architecture to extend scanner device drivers of the scanner, the image acquisition tree architecture including multiple image source items that correspond, respectively, to the plurality of image sources of the scanner, at least one of the multiple image source items having multiple sub-items corresponding to different portions of an associated image source; and report, from a root item of the image acquisition tree architecture of the operating system, from which of the plurality of images sources the scan is available to an application executed on the computer.

16. A method as described in claim 15, wherein the indication is communicated to the operating system responsive to initiation of the scan at the scanner.

17. A method as described in claim 15, further comprising setting one or more scan parameters by the application responsive to the report.

18. A method as described in claim 15, wherein the scanner is communicatively coupled to the computer as a peripheral device.

19. A method as described in claim 15, wherein the operating system is further executed at the computer to:
  detect a mode in which one or more scan parameters are set by a user at the scanner; and
  keep the one or more scan parameters as set at the scanner for the scan when the scan is received in conjunction with the detected mode.

20. A method as described in claim 19, wherein the one or more scan parameters include color mode, scan resolution or crop area.

\* \* \* \* \*